Aug. 23, 1966  K. JANSEN  3,268,633
METHOD OF CONTINUOUSLY FORMING CARBON ARTICLES
Filed Sept. 21, 1965
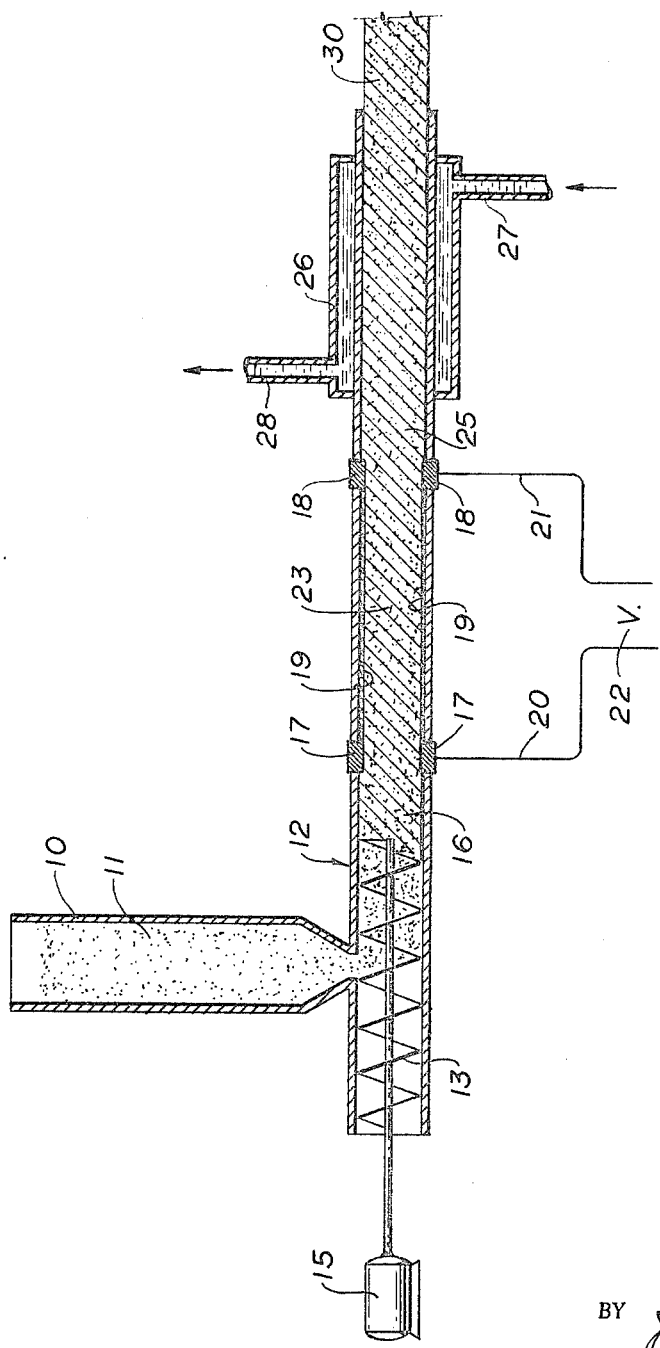
INVENTOR.
KARL JANSEN
BY James E. Tooney
ATTORNEY United States Patent Office 3,268,633
Patented August 23, 1966

3,268,633
METHOD OF CONTINUOUSLY FORMING
CARBON ARTICLES
Karl Jansen, Cleveland, Ohio, assignor to Kaiser Industries Corporation, Oakland, Calif., a corporation of Nevada
Filed Sept. 21, 1965. Ser. No. 488,935
3 Claims. (Cl. 264—27)

This application is a continuation-in-part of my co-pending application Serial Number 167,794 filed January 22, 1962 and entitled "Method and Apparatus."

This invention relates to a method for preparing a continuous electrically conductive carbon element. Particularly, this invention relates to the production of an indefinite length of electrically conductive carbon useful for electrodes for arcs or electrolytic processes such as the reduction of metal oxides.

Carbon electrodes conventionally are prepared by bonding particles of relatively high purity carbonaceous material with other materials that are capable of being thermally converted into similar carbonaceous material. Specifically, small particles of high purity coke may be blended with pitch, tar or similar hydrocarbon material and bonded into blocks that are called "green" blocks that are capable of maintaining their shape because of the sticky, viscous nature of the bonding material. The green blocks are then baked at temperatures that are high enough to thermally convert the pitch into coke whereupon the original particles of coke are cemented together by the coke that results from the decomposition of bonding material, and the resultant product is a carbon element that has high electrical conductivity. In producing such electrically conductive elements it is desired to make them very dense, highly conductive, and resistant to physical strain. However, the extremely high temperatures required for producing electrically conductive carbon elements frequently creates undesirable properties in the product.

One problem is that differential thermal expansion and contraction within the block, during heating and cooling will cause cracks or at least insipient cracks that are sensitive to physical strains. Also, "green" blocks tend to slump or sag when hot enough to make the binder fluid but not yet hot enough to effect coking reactions of the binder and this problem causes distortion of the shape of the material during its production. Another problem is that the thermal coking reactions of the binder result in the production of volatile material which must escape from the interior of the block, and in escaping it leaves voids between the particles which are inherent weaknesses in the block and which disturb the uniform cross section so that electrical conductivity is diminished per unit of cross section and not constant along the length of the product.

Another problem is transmitting heat uniformly into the block. Although carbon is highly electrically conductive it does not conduct heat well and it is difficult to get the center of the element hot enough to coke without overheating the exterior. It is also difficult, when the material is enclosed in a mold, to conduct all the heat required for coking through the mold wall. For example, in making large electrodes for aluminum reduction cells it is frequently necessary to bake a block of coke and bonding material from 25–30 days in order to insure that all portions of the block are at high enough temperature for a time sufficient to complete the coking reactions of the bonding material. It is evident that such a long baking period is not only expensive from the standpoint of fuel consumption, but any installation for the production of carbon elements requires extremely large capitalization. For example, if the baking time for a carbon element could be reduced from 25 days to 1 day, production capacity could be obtained with only one twenty-fifth of the original equipment.

Still another problem is making green blocks with enough green strength to maintain their shape and to insure handling. The green strength requirements create rigid specifications for materials that are not important in the finished product.

The present invention overcomes or mitigates many of the problems associated with the prior methods for producing electrically conductive carbon elements. The present method may produce a continuous electrically conductive element which is of indefinite length and may be cut to any given length. The process of the present invention is such that the heat necessary for effecting the thermal reactions is generated within the electrically conductive element itself and it is produced most intensely where it is most needed. In addition, since the heat is developed within the electrically conductive element itself it is not necessary to surround the element with walls that are hotter than the element in order to transfer heat from outside of the mold walls to the element and the heat is available immediately and uniformly across the cross section of the element. Additionally, the process of the present invention overcomes the problem of slumping and discontinuities created by the production of volatiles because, in this process, the element is completely contained and pressure is continuously exerted against the electrically conductive element being formed so that the cross section of the mold is always filled, volatiles are expelled and any blow holes created by the volatiles are closed and welded shut and a dense product results.

Additionally, in the present process it is not necessary to choose starting materials to provide green strength because a green block is not made and accordingly a much greater latitude is available in both the identity of and the concentration of constituents in the mixture fed to the process.

Also, in the process of this invention, heat is produced locally according to the process needs within the electrically conductive element so that electric energy passes readily through those portions of the element that are compact and bonded that no longer need heating whereby a savings in power consumption may be obtained.

The process of the present invention includes producing a charge mixture of electrically conductive carbon and a bonding material that is (1) capable of decomposing into electrically conductive carbon, and (2) capable of bonding, in its decomposed condition, the particles of carbon in the charge. In this specification and the accompanying claims the term carbon is intended to mean materials that are substantially all carbon except for minor impurities and such materials as petroleum coke or metallurgical coke are typical examples. The bonding materials are carbonaceous materials which are capable of being coked to become essentially carbon, and these materials are typically tar or pitch or other high molecular weight hydrocarbons.

The mixture of carbon particles and bonding material is introduced into an elongated chamber which is shaped at least at the discharge end, to have the same cross section as the cross section shape desired in the conductive carbon element. The inlet end of the chamber has a pressure applying means for advancing the charge through the chamber, and in advancing the charge the mixture is compacted.

The pressure applying means both compacts the mix and advances it toward the first of two electrodes which are positioned within the elongated chamber to be in electrical contact with the mix as it passes through the elongated chamber. The portion of the elongated chamber between the electrodes is electrically insulated to prevent short circuiting the charge. The pressure applying means is also electrically insulated from the ground to prevent a flow of electric energy from the electrodes back through the mix toward the pressure applying means. The device is constructed so that electric energy is caused to flow only between the two electrodes through the mixture of carbon and bonding material that is between them.

The bonding material usually has low electrical conductivity and the particles are spaced from one another at least by the bonding material. As a result, the mixture of particles and bonding material has a relatively high electrical resistance and the passage, for example, of a low voltage high amperage current through the mixture produces high temperature where the resistance of the mixture is highest. As a result of the high temperature the bonding material begins coking with the concomitant production of volatile material but, the volatile material produced in the process of the present invention is squeezed from the mixture and flows back through the more porous portions of the mixture to be expelled in the vicinity of the pressure applying means. In this manner, the volatile material is not only removed from the product, but it serves incidentally to preheat the charge approaching the zone between the electrodes.

As the process continues the mixture of bonding material and conductive particles becomes denser and more electrically conductive, and eventually the bonding material is substantially completely coked to produce a solid, dense, strong carbon element. Also, as the composition of the electrode becomes denser and more uniform the electrical conductivity increases and less power is consumed in producing the heat necessary to make the final coking, and as the carbon body approaches the second electrode it will be consuming very little electrical energy and will be acting primarily as a conductor.

As the bonded carbon body is advanced past the second electrode it no longer carries electric energy and it may be discharged from the elongated chamber, cooled, and formed into elements of any desired length.

The accompanying drawing is a highly schematic representation illustrating one embodiment of the present invention and it is intended to be illustrative rather than limiting on the scope of the invention.

In the drawing, bin 10 is filled with a mixture of electrically conductive coke particles and pitch. The mixture 11 may be either warm or cool, and it is introduced into elongated chamber 12 and is here advanced through chamber 12 by a pressure applying means 13 shown here as a worm that is driven by a shaft connected to motor 15. The worm advances the unbonded mixture through the passageway 12 and, because it must force a long body of material in front of it, the mixture becomes highly compacted by the time it reaches the point 16 beyond the worm 12. As the carbon and pitch mixture advances through passageway 12 it comes in contact with one or more electrodes 17 and begins to carry current toward one or more electrodes 18. The portion of the passageway 12 between electrodes 17 and 18 is lined with electrically insulating material 19 to insure that the electric energy does not by-pass the carbon body. The electrodes are shown schematically connected through wires 20 and 21 to a source of electric energy indicated at 22.

Thus, the portion of the mixture illustrated at point 23 carries sufficient electric energy to raise the temperature of the mixture to the temperature at which the bonding material will coke. It is evident that the coking starts substantially at the electrodes 17 because at that point the resistance of the carbon body is highest and the initial coking reactions are most easily accomplished. As a result of such coking actions volatile materials are produced within the mixture. However, the volatile materials are squeezed out of the mixture by the pressure exerted on the body of carbon and flow backwards through the more granular material past the worm 13 discharging into the atmosphere or into a suitable collection system. As the mixture advances toward electrode 18 the coking reactions of the bonding material are completed and the carbon element becomes denser and more highly conductive of electricity. Also, as the coking reactions proceed less volatile material is produced and therefore the need for discharging it diminishes. At position 25 the carbon element is completely bonded and is then advanced into a jacketed cooling zone 26 where cooling water introduced through line 27 and discharged through line 28 reduces the temperature of the carbon element to a workable temperature. The electrically conductive carbon element 30 may then be discharged and subsequently sawed, drilled or otherwise formed for its intended use.

Typically, the electric energy is supplied to raise the temperature of the body to about 1200° C. and it is maintained at that temperature long enough for the coking reactions to be complete, however, depending on the nature of the charge higher or lower temperatures may be used. The worm feeder 13 illustrated in the drawing may be replaced with other suitable pressure applying means such as a plunger fitting snugly within the passageway 12. If a plunger is employed the feed of mixture 11 is intermittent rather then continuous and the advance of the product through the passageway 12 is also intermittent rather than continuous, but in either case a continuous product 30 is formed because the serially injected slugs of feed mixture are compacted into a uniform body at point 16 and bonded into a continuous body at 23. Within the scope of this invention it may also be desirable to restrict the cross section of passageway 12 at some point to increase the force required to advance the body, and therefore the pressure upon the body of material advancing through the passageway, or to extrude the product into special cross sectional shapes. Generally speaking, the amount of pressure on the body, for example at point 23, can be regulated by the total length of the body that is being advanced through passageway 12 from the introduction of mixture 11 to the recovery of product 30.

The insulated portion of passageway 12 between the electrodes 17 and 18 may be of heat resistant ceramic material such as metal oxides, silica or the like, or it may comprise a metal sleeve spaced from the main wall of the passageway by a ceramic material or an equivalent heat resistant electrical insulator.

As may be seen from the foregoing discussion, the process of this invention produces a continuous product in a matter of hours using uniformly distributed and internally produced heat that is produced in accordance with local needs. The process also produces a dense, non-porous product with precise cross section and one that can be made without regard to green strength, and therefore with much wider ranges of ingredients.

What is claimed is:

1. The method for producing electrically conductive carbon elements which comprises,
    (A) preparing a mixture of electrically conductive carbon particles and a bonding material, said bonding material being thermally convertible to electrically conductive carbon which is capable of bonding said particles,
    (B) introducing the mixture into an elongated chamber the terminal portion of which has the same cross section as the desired cross section of the electrically conductive carbon elements,
    (C) advancing the mixture through the elongated chamber by means capable of exerting pressure on the mixture, said means being insulated from ground,
    (D) advancing the mixture while under pressure to a position between two electrodes both of which are positioned to be in electrical contact with the mixture and electrically insulated from each other except for the length of said mixture between them, (E) passing electric current through the portion of the mixture between said electrodes at a sufficient rate and for a sufficient time to raise the temperature of the mixture to the coking temperature of the binder, and (F) advancing the resultant bonded electrically conductive material out of the elongated chamber.

2. The process of claim 1 wherein the carbon particles are coke and the binder is pitch.

3. The process of claim 1 wherein the mixture is heated to a temperature in excess of 1200° C.

References Cited by the Applicant

UNITED STATES PATENTS 2,335,308 11/1943 Pendergrast et al.
2,799,052 7/1957 Stroup.

FOREIGN PATENTS 517,798 2/1940 Great Britain.

ROBERT F. WHITE, *Primary Examiner.*

J. A. FINLAYSON, *Assistant Examiner.*